United States Patent [19]

Cutburth

[11] Patent Number: 4,811,619
[45] Date of Patent: Mar. 14, 1989

[54] MOTORIZED CONTROL FOR MIRROR MOUNT APPARATUS

[75] Inventor: Ronald W. Cutburth, Tracy, Calif.

[73] Assignee: The United States of America as represented by the United States Department of Energy, Washington, D.C.

[21] Appl. No.: 204,944

[22] Filed: Jun. 6, 1988

Related U.S. Application Data

[63] Continuation of Ser. No. 911,843, Sep. 26, 1986, abandoned, which is a continuation-in-part of Ser. No. 759,773, Jul. 29, 1985, abandoned.

[51] Int. Cl.⁴ .................... F16H 25/20; F16H 57/10; G05G 5/06
[52] U.S. Cl. ................... 74/424.8 B; 74/527; 74/530; 74/411.5
[58] Field of Search ............ 74/424.8 B, 802, 527, 74/530, 531, 411.5

[56] References Cited

U.S. PATENT DOCUMENTS

| | | | |
|---|---|---|---|
| 215,778 | 5/1879 | Tyson | 74/424.8 B |
| 1,413,982 | 4/1922 | Gill | 74/424.8 B |
| 2,130,111 | 9/1938 | Whitney et al. | 74/802 |
| 2,399,906 | 5/1946 | Bentley | 74/527 |
| 2,481,477 | 9/1949 | Peery | 74/424.8 B |
| 2,591,338 | 4/1952 | Cooper | 74/530 |
| 2,791,914 | 5/1957 | Cornelius | 74/527 |
| 2,877,654 | 3/1959 | Biemiller et al. | 74/530 |
| 3,008,375 | 11/1961 | Henderson | . |
| 3,530,734 | 9/1970 | Wray et al. | 74/424.8 B |
| 3,579,140 | 5/1971 | Anderson et al. | . |
| 3,588,249 | 6/1971 | Studebaker | . |
| 3,803,927 | 4/1974 | Lawler | 74/424.8 B |
| 3,830,561 | 8/1974 | Le Fave et al. | . |
| 3,902,575 | 9/1975 | Nelson et al. | 74/531 |
| 3,986,767 | 10/1976 | Rexer et al. | . |
| 4,101,206 | 7/1978 | Oskam et al. | . |
| 4,144,505 | 3/1979 | Angelbeck et al. | . |
| 4,146,329 | 3/1979 | King et al. | . |
| 4,186,991 | 2/1980 | Koide et al. | . |
| 4,208,930 | 6/1980 | Hermann | 74/527 |
| 4,344,729 | 8/1982 | Orsinger et al. | 74/531 |
| 4,442,392 | 4/1984 | Hore | 74/527 |
| 4,521,650 | 6/1985 | Oswald | 74/531 |

FOREIGN PATENT DOCUMENTS 363423 11/1922 Fed. Rep. of Germany ... 74/424.8 B

*Primary Examiner*—Lawrence Staab
*Attorney, Agent, or Firm*—P. Martin Simpson, Jr.; Roger S. Gaither; Judson R. Hightower

[57] ABSTRACT

A motorized control and automatic braking system for adjusting mirror mount apparatus is disclosed. The motor control includes a planetary gear arrangement to provide improved pitch adjustment capability while permitting a small packaged design. The motor control for mirror mount adjustment is suitable for laser beam propagation applications. The brake is a system of constant contact, floating detents which engage the planetary gear at selected between-teeth increments to stop rotation instantaneously when the drive motor stops.

9 Claims, 3 Drawing Sheets

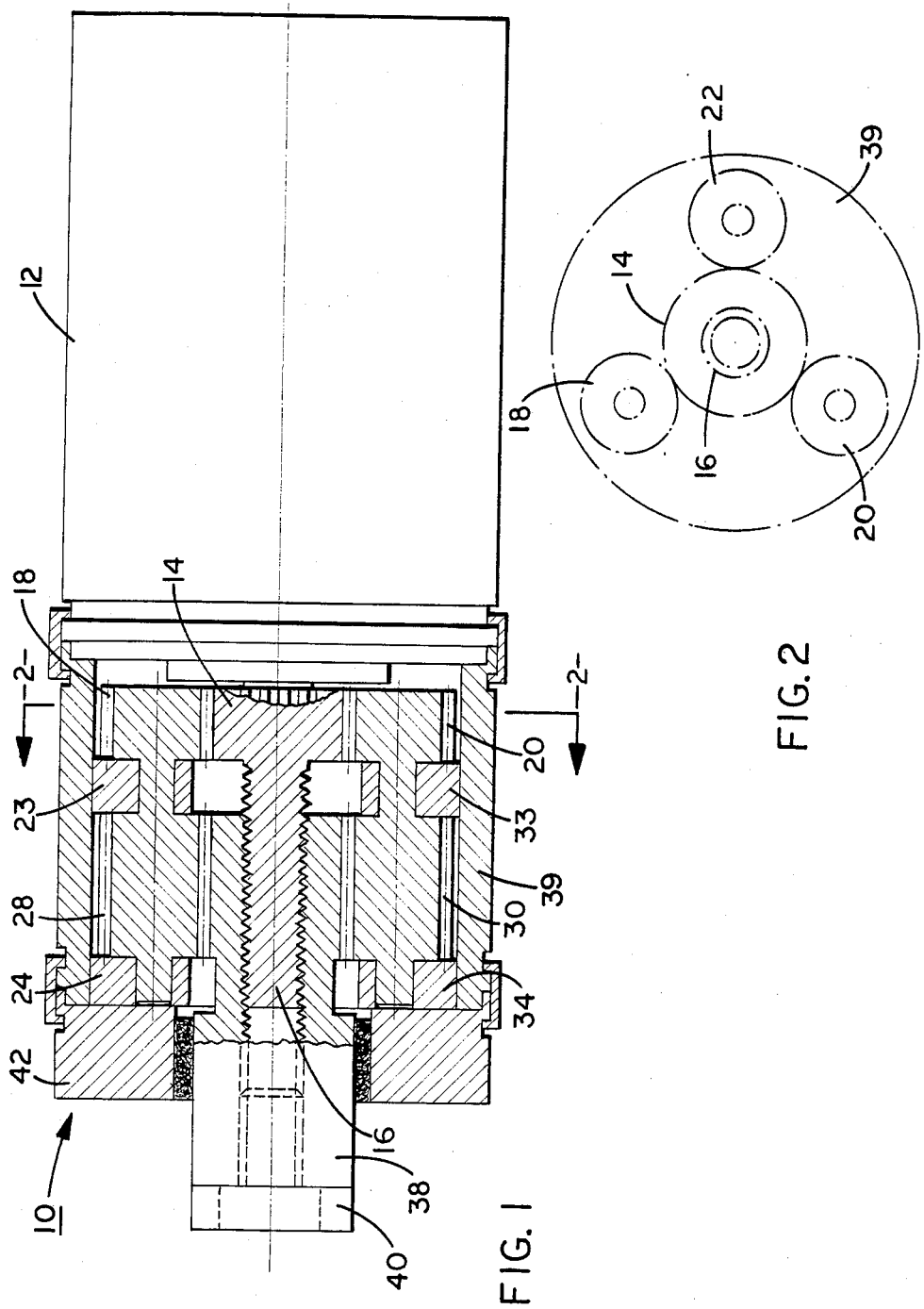

MOTORIZED CONTROL FOR MIRROR MOUNT APPARATUS

The United States Government has rights in this invention pursuant to Contract No. W-7405-ENG-48 between the United States Department of Energy and the University of California for operation under Lawrence Livermore National Laboratory.

FIELD OF THE INVENTION

This is a continuation of U.S. patent application Ser. No. 911,843, filed 9/26/86, now abandoned, which is in turn a continuation-in-part of U.S. patent application Ser. No. 759,773, filed 7/29/85, also abandoned.

BACKGROUND OF THE INVENTION

The present invention relates to a motorized control apparatus for adjusting a mirror mount for use, in particular, in laser applications.

In order for laser beams to be propagated properly, it is generally necessary to provide for quite accurate adjustments in the positioning of mirrors used to reflect the beams. The laser beams are typically reflected along a desired path between the reflective surfaces of the mirrors and the positioning and adjustment of these mirrors must be very precise in order to ensure proper laser beam propagation. It is required that any adjustments to the position of the mirror be very precise in order to provide for a corresponding adjustment to the propagation of the laser beam itself.

Prior art mirror mount adjustment apparatus have been bulky, requiring large packages and complex gear arrangements to provide the required fine tuning capability. The complex gear arrangements, while achieving the desired objective of providing suitable tuning capability, are costly and quite complex. The complexity further introduces problems in the overall adjustment because of backlash that can occur when adjusting the mirror mount.

Another approach in the prior art is the implementation of micrometer-type techniques for providing suitable adjustment of the mirror mount position. Micrometer techniques utilize what is known as a differential motion, wherein the difference in thread sizes achieves a differential pushing motion. However, one problem with micrometer adjustments is that micrometers are utilized for measuring purposes and were not originally designed for adjustment purposes, which typically require greater amounts of force to be applied. A micrometer arrangement is necessarily and inherently limited in providing the suitable force required for mirror mount adjustment purposes in laser applications.

SUMMARY OF THE INVENTION

It is an object of the present invention to provide for an improved mirror mount adjustment control apparatus for laser applications.

It is a further object to provide an improved mirror mount adjustment apparatus which is compact in design.

It is still another object to provide for an improved mirror mount adjustment apparatus which provides for high precision adjustments.

In a preferred embodiment, the present invention comprises planetary gear means having a toothed gear surface for generating a rotational force in a first direction; second gear means having a toothed gear surface responsive to said rotational force for generating a differential driving force substantially perpendicular to the plane of said planetary gear means; means for selectively rotating said planetary gear means; and brake means comprising first detent means engaging one of said toothed gear surfaces and second adjustable detent means resiliently biasing said first detent means against said one toothed gear surface for terminating rotation thereof upon cessation of said selective rotation.

This differential force can be utilized, in one embodiment, in a mirror mount adjustment apparatus for laser applications. The perpendicular force can be generated with high torque to provide suitable adjustment forces and, in addition, with high precision.

Additional objects, advantages and novel features of the present invention will be set forth in part in the description which follows and in part become apparent to those skilled in the art upon examination of the following or may be learned by practice of the invention. The objects and advantages of the invention may be realized and attained by means of the instrumentalities and combinations which are pointed out in the appended claims.

BRIEF DESCRIPTION OF THE DRAWINGS

The accompanying drawings which are incorporated in and form a part of this specification illustrate an embodiment of the invention and, together with the description, serve to explain the principles of the invention.

FIG. 1 depicts a side, partially cross-sectional view of an improved mirror mount apparatus according to the present invention.

FIG. 2 depicts a partial cross-section of the apparatus of FIG. along lines 2—2.

DETAILED DESCRIPTION OF THE DRAWINGS

Figure 3:
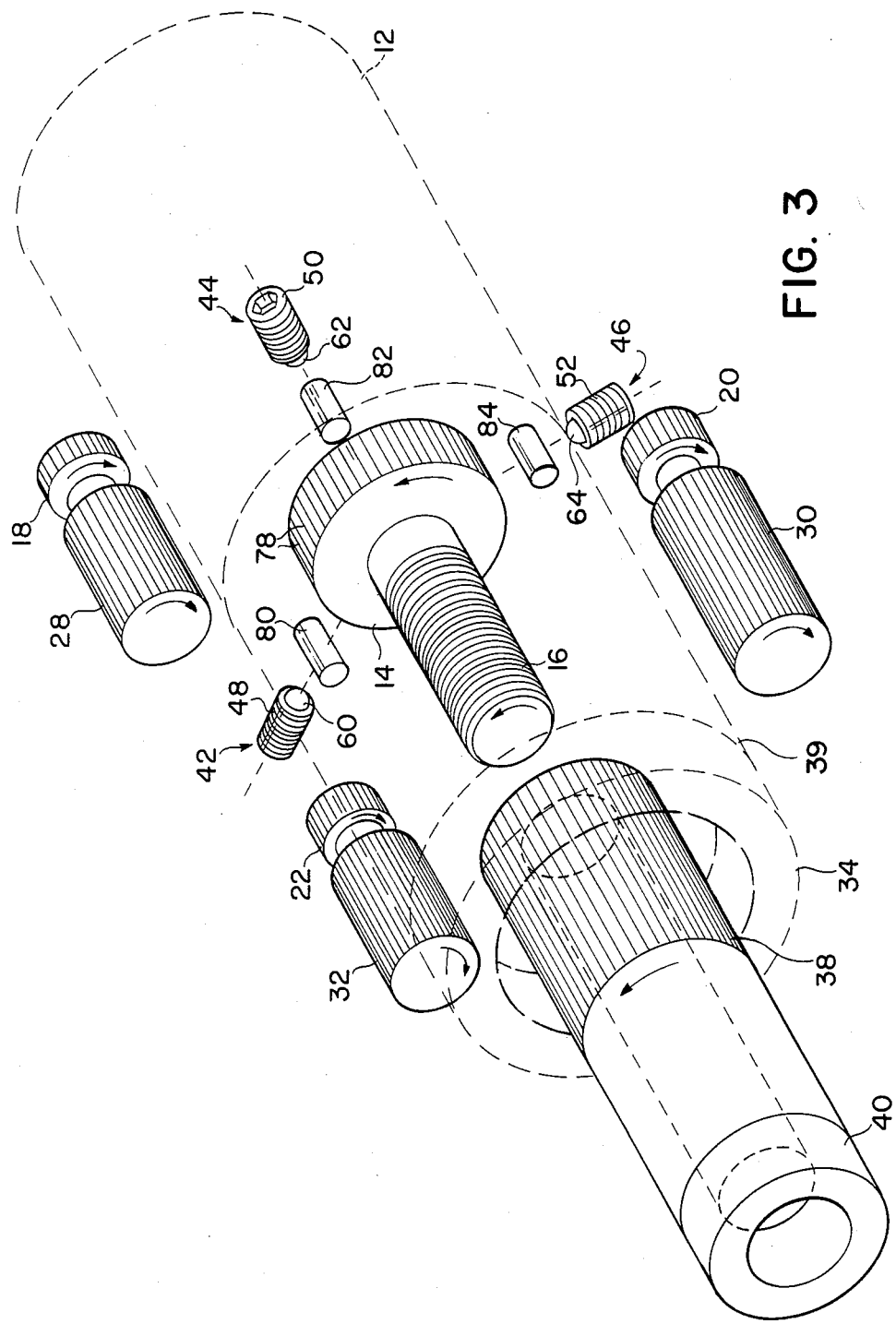
FIG. 3 depicts an exploded perspective view of the present invention.

Reference will now be made in detail to the preferred embodiment of the invention, an example of which is illustrated in the accompanying drawings. While the invention will be described in conjunction with the preferred embodiment, it will be understood that it is not intended to limit the invention to that embodiment. On the contrary, it is intended to cover alternatives, modifications and equivalents as may be included within the spirit and scope of the invention as defined by the appended claims.

Referring now to FIG. 1, a side, partially cross-sectional view of the present invention is depicted. In FIG. 1, the present invention is intended to be utilized for application to adjustment of mirror mounts in laser beam propagation systems. However, the present invention can be utilized for other purposes, such as for micrometer measurement-type applications and the like.

Referring to FIG. 1, the apparatus 10 depicted therein includes a stepper motor 12, which can be any type of stepper motor apparatus for generating a suitable driving force.

The stepper motor 12 is connected to a drive gear 14, which can also be characterized as a "sun" gear. The stepper motor drives the sun gear 14, and in addition generates a rotational force for motor shaft 16.

The drive gear 14 is connected to a planetary gear arrangement of gears 18, 20 (plus another additional gear, not shown). The rotation of drive gear or sun gear 14 will be in the opposite directional rotation as the planetary gears 18, 20 (and gear 22 in FIG. 2). This aspect is shown in more detail in FIG. 2, which is a cross-sectional view of the invention depicted in FIG. 1 taken along lines 2—2.

As seen in FIG. 2, sun gear 14 rotates in a counter-clockwise direction. The action of gear 14 effects a rotation of gears 18, 20 and 22 in a clockwise rotation, as indicated by the direction of arrows in FIG. 2.

Referring again to FIG. 1, the planetary gears 18, 20, as shown, are connected to gears 28, 30, respectively. The additional planetary gear 22 would be connected to another gear 32, if this view were shown in FIG. 1. Also, FIG. 1 illustrates spacers 23 and 33 between respective gears sets 18 and 28 and 20 and 30, and spacers 24, 34 between gears 28, 30 and housing 42.

The rotation of planetary gears 18, 20 and 22 effect a rotation of gears 28, 30, 32. Gears 28, 30 and 32 can be mounted within a ring gear not shown.

Gears 28, 30 and 32 are arranged to engage another gear 38, which is intended to engage the motor shaft 16 of FIG. 1 and ring gear 39 of FIG. 2.

The gear 38 (within gears 28, 30 and 32), when interacting with gears 28, 30 and 32 and the motor shaft 16, effects a force which is generally perpendicular to the planar axis of planetary gears 18, 20, 22. This aspect will be described in more detail in conjunction with FIG. 3.

Referring now to FIG. 3, an exploded perspective view of the present invention is depicted.

In FIG. 3, the stepper motor 12 provides a driving force for main or sun gear 14 and in addition for drive motor shaft 16. The rotation of sun gear 14 effects a rotation of planetary gears 18, 20 and 22, as illustrated in FIG. 2.

The planetary gears of FIG. 3 are connected to gears 28, 30, 32, respectively.

Those gears in turn engage with central gear 38 (and the associated ring gear if used). Gear 38 is further adapted to engage the motor shaft 16. The respective threads (the female threads of gear 38 and the male threads of shaft 16) are of the same dimension.

The gears 18, 20, 22 and 28, 30, 32 are of different sizes to effect a differential force upon gear 38 and drive shaft 16. The effect brings about a differential motion which is generally perpendicular to the plane of rotation of gears 18, 20, 22. It has been found that this differential perpendicular force is highly accurate for adjustment purposes, which is highly desirable for applications in mirror mount adjustments for laser beam propagation.

As illustrated in FIGS. 1-3, a small package size is possible with the present invention. The engagement of a planetary gear arrangement with the generation of a differential force provides for ultra-high precision which is adaptable for laser applications.

In some applications, where a high amount of torque is not necessary, a single planetary gear, such as gear 18, engaging an additional gear, such as gear 28, is all that is necessary for providing the suitable rotational force for adjustment purposes.

In operation, gear 14 drives gear 18 which is connected to gear 28. Gear 28 provides a driving rotational force for gear 38, which is internal to gear 28. The female thread within gear 38 rotates in the same direction as motor shaft 16. The differential in the gear arrangement produces the differential in forward motion in a highly accurate fashion. Stated otherwise, rather than providing a differential in threads as with micrometer arrangements, a differential motion is initiated by the combination of the planetary gear arrangement.

Figure 4:
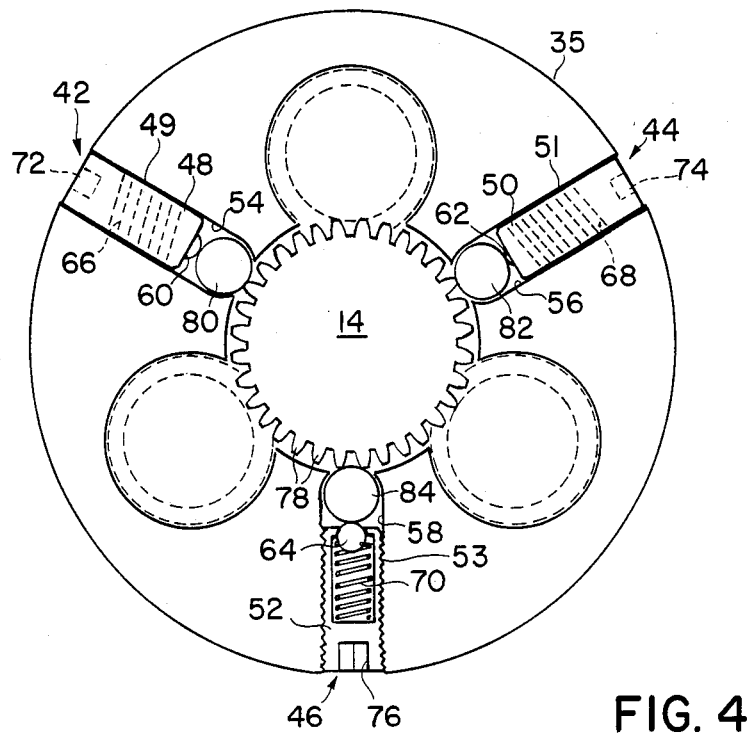
FIG. 4 is a transverse cross-sectional view of FIG. 3 illustrating the relative positions of the sun gear, the planetary gears and the ball detent clutch elements.

As shown in the exploded perspective view of FIG. 3 and in the transverse cross-sectional view of FIG. 4, in a presently preferred embodiment the apparatus of the present invention incorporates a number (illustratively, three) of ball detent components 42, 44 and 46 which cooperatively brake the above-described differential adjustment motion when stepper motor 12 is stopped. While, as described above, there is very little inherent play or backlash in the differential-motion adjustment systems, the braking action provided by the cooperative ball detent components 42, 44 and 46 reduces play and backlash even further. In addition, the ball detent braking components 42, 44 and 46 are maintained in constant, low friction floating engagement with the sun gear 14 or other gear to provide instantaneous braking action when the stepper motor 12 is stopped, yet without providing significant impediment to the motor-driven operation of the differential-motion adjustment system.

The cooperating spring-biased ball detent components 42, 44 and 46 comprise, respectively, externally-threaded ball detents 48, 50 and 52 having external threads 49, 51 and 53 formed thereon. Also, each ball detent 48, 50 and 52 includes a ball 60, 62 and 64, which is biased outwardly by an internal spring 66, 68 and 70. These spring-biased ball detent components 42, 44 and 46 are adjustably positioned within threaded bores 54, 56 and 58 formed in the gear housing 35 by using standard hex wrenches (not shown) that are inserted into hex sockets 72, 74 and 76 formed in the outer end of the ball detents 48, 50 and 52.

Referring further to FIGS. 3 and 4, cylindrical detents 80, 82 and 84 are positioned in the bores 54, 56 and 58 and resiliently biased against the teeth 78—78 of sun gear 14 by the adjustable-position ball detents 48, 50 and 52. Due to its adjustable spring-biased mounting, each ball 60, 62 and 64 acts as a biasing ball bearing which forces associated cylindrical detents 80, 82 or 84 into rotating engagement with gear teeth 78—78. This adjustable bias feature permits the force of engagement between the detents or pins 80, 82 and 84 and the gear 14 to be readily adjusted to a value which allows these pins to easily ride along the gear teeth 78—78 and be repeatedly pushed upwardly out of the way by the gear teeth during rotation of the adjustment system and gear 14. Yet, at least one of the pins 80, 82, 84 will be positioned in or near the gap between adjacent gear teeth 78—78 when the motor 12 is stopped and will instantaneously prevent additional movement of the teeth 78—78, the sun gear 1 and the other related gearing including the push shaft 38.

While it is possible to use a single spring-biased ball detent component such as 42 in low torque applications to provide the desired constant contact, automatic adjustable braking action, a multiple component system such as the three-component system illustrated in FIGS. 3 and 4 is preferable. This is because a multiple component braking system provides very precise, divided-increment stopping action on the gear teeth 78—78. Consider, for example, a typical system in which one pulse or step of the stepper motor 12 drives the sun gear through a step angle of about 7.5°. A typical sun gear configuration of twenty-eight to thirty-two gear teeth 78—78 provides a teeth spacing of approximately 11°-12°/tooth. Using equi-angular spacing between the ball detent components 42, 44 and 46 (120° between adjacent components or assemblies) effectively provides three cylindrical detents or pins for each 11°-12° spacing between gear teeth, and an average angle of about 4° between adjacent detents. On the average, then, one of the cylindrical detents or pins 80, 82 or 84 will drop into the gap between two adjacent gear teeth 78—78 within 4° of additional rotation after the stepper motor 12 is stopped. This is approximately one-third of the tooth spacing and less than the step angle. Even greater braking precision can be attained by increasing the number of spaced ball detent assemblies. Also, if desired, the angular positions of the detents 42, 44, 46 relative to the teeth 78—78 can be precisely located so that when one ball detent such as 80 is at a given position such as top dead center on a tooth 78, the other ball detents such as 82 and 84 occupy predetermined different intermediate positions between the nearest adjacent teeth. For example, ball detents 82 and 84 can be offset 4° and 8° clockwise, respectively, from top dead center.

The present invention can provide high torque and high thrust conversion capabilities while a the same time providing compactness, which provides for higher precision.

The planetary gear arrangement (a first differential) together with a second gear-motor shaft combination (second differential) provides in effect a double, differential motion capability.

The present invention provides for improved backlash and play reduction because of the smaller part requirements and reduction in dimension, for the reason that fewer parts are required. Backlash and play are further reduced because of the use of the spring-biased detent braking system which provides multiple contact points and divided increment tooth-to-tooth engagement on the gear teeth of the sun gear. Of course, ball detent assemblies could be applied to any or all of planetary gears such as 18, 20, 22, 28, 30 and 32 and to the gear 38.

The braking system of the present invention is a compact, entirely mechanical system and, thus, eliminates potential problems due to electromagnetic interference and to the wiring and wire routing that are associated with electrical clutches.

The braking system of the present invention is reversible in that it operates equally well as a brake when the associated gear(s) such as sun gear 14 is driven either clockwise or counter-clockwise.

The braking system used in the present invention uses a low friction metal-to-metal floating contact between the ball detents such as 80 and gear teeth such as 78—78, and does not use lubricants, which require replacement and/or can be contaminants in vacuum applications.

Moreover, the overall invention including the braking system uses relatively few parts, which enhances the reliability and maintenance and reduces cost.

The differential drive arrangement of the present invention coupled with the spring-biased detent braking system provides a very precise adjustment operation coupled with instantaneous braking response.

The present invention, although described for a motorized control apparatus for mirror mounts in laser propagation systems, is suitable also for such applications as micrometer measurement applications.

The foregoing description of the preferred embodiment of the invention has been presented for purposes of illustration and description. It is not intended to be exhaustive or to limit the invention to the precise form disclosed and many modifications and variations are possible in light of the above teaching. For instance, the invention could utilize a fixed center gear rather than a ring gear for the planetary gears. The preferred embodiment was chosen and described in order to best explain the principles of the invention and its practical applications to thereby enable others skilled in the art to best utilize the invention and various embodiments and with various modifications as are suited to the particular use contemplated. It is intended that the scope of the invention be defined only by the claims appended hereto.

What is claimed is:

1. Apparatus comprising:
   planetary gear means including a sun gear rotatable about an axis thereof having a first toothed gear surface for generating a rotational force in a first direction, second gear means having a second toothed gear surface responsive to said rotational force for generating a differential driving force substantially perpendicular to said rotational force, and means for selectively rotating said planetary gear means, and
   brake means comprising a rotatable detent in the form of a cylinder having a diameter greater than the pitch of the gear of said first toothed gear surface and having an axis parallel to said sun gear axis, said cylindrical detent engaging said first toothed gear surface and being rotatable therewith in either direction about said cylinder axis, and spring means resiliently biasing said cylindrical detent into floating engagement against said first toothed gear surface for permitting rotation thereof by said rotation means and terminating rotation thereof upon cessation of rotation of said rotating means in either direction.

2. The apparatus as in claim 1 wherein said planetary gear means include at least one planet gear for engaging and being rotated by said sun gear to generate said rotational force.

3. The apparatus as in claim 2 wherein said planetary gear means includes three planet gears for engaging and being rotated by said sun gear.

4. The apparatus as in claim 2 wherein said second gear means includes second planetary gear means axially connected to said planetary gear means, and
   third gear means oriented within said second gear means for rotationally engaging said second gear means,
   said sun gear further including a drive shaft for engaging said third gear means so as to generate said differential force.

5. The apparatus of claim 4, further including a plurality of said brake means angularly spaced about and engaging the periphery of said sun gear surface at selected increments between the teeth thereof.

6. The apparatus as in claim 5, said rotating means including motor means for driving said planetary gear means and said drive shaft.

7. The apparatus as in claim 6 wherein said motor means include a stepper motor.

8. The apparatus as in claim 6 wherein said third gear includes female threads and wherein said drive shaft include male threads of the same size to engage one another.

9. A method of rotating and stopping a linear actuator mechanism comprising:

providing a linear actuator comprising (1) a rotatable first shaft, the first shaft having external teeth and an internal threaded bore and (2) differential drive means for the first shaft comprising a second rotatable shaft, the second shaft being a drive shaft having external threads mating with the internal threads of the first shaft and mounting a sun gear for rotation therewith, and a planetary gear system drivingly engaged by the sun gear and engaging the external teeth of the first shaft for creating differential axial movement of the first shaft;

providing at least one cylinder detent resiliently biased against the teeth of the sun gear, the cylinder having an axis parallel to the axis of the sun gear and being of diameter greater than the pitch of the sun gear so that the cylinder floats along the sun gear teeth, thereby permitting rotation of the second shaft;

providing means for rotating the second shaft;

activating the rotation means to rotate the second shaft in a selected direction, to thereby move the first shaft axially in a selected direction; and inactivating the rotation means, whereupon the floating cylindrical detent stops the rotation of the sun gear and the associated axial movement of the first shaft.

* * * * *